US011497200B1

(12) United States Patent
Kim

(10) Patent No.: US 11,497,200 B1
(45) Date of Patent: Nov. 15, 2022

(54) WING ATTACHMENT FOR BAIT FISH LURES

(71) Applicant: Kenneth Kim, Franklin, TN (US)

(72) Inventor: Kenneth Kim, Franklin, TN (US)

( * ) Notice: Subject to any disclaimer, the term of this patent is extended or adjusted under 35 U.S.C. 154(b) by 0 days.

(21) Appl. No.: 17/385,089

(22) Filed: Jul. 26, 2021

(51) Int. Cl.
  *A01K 83/06* (2006.01)
  *A01K 85/00* (2006.01)
  *A01K 85/01* (2006.01)

(52) U.S. Cl.
  CPC ............ *A01K 83/061* (2022.02); *A01K 83/06* (2013.01); *A01K 83/063* (2022.02); *A01K 85/012* (2022.02); *A01K 85/1817* (2022.02); *A01K 85/013* (2022.02)

(58) Field of Classification Search
  CPC .... A01K 83/06; A01K 83/061; A01K 83/064; A01K 85/011; A01K 85/013; A01K 85/01; A01K 83/063; A01K 85/012; A01K 85/1813; A01K 85/1817
  USPC ....... 43/42.32, 44.2, 44.4, 44.8, 44.6, 42.33, 43/42.26, 42.27
  See application file for complete search history.

(56) References Cited

U.S. PATENT DOCUMENTS

| 2,238,900 | A | * | 4/1941 | Hadaway | A01K 85/16 43/44.6 |
| 2,461,755 | A | * | 2/1949 | Miller | A01K 83/06 43/44.8 |
| 2,518,593 | A | * | 8/1950 | Bell | A01K 83/06 43/44.2 |
| 2,565,956 | A | * | 8/1951 | Duhamel | A01K 83/06 43/44.4 |
| 2,582,646 | A | * | 1/1952 | Moore | A01K 83/06 43/44.2 |
| 2,588,526 | A | * | 3/1952 | Hoage | A01K 83/06 43/44.6 |
| 2,760,294 | A | * | 8/1956 | Morrill, Jr. | A01K 85/16 43/42.27 |
| 2,763,086 | A | * | 9/1956 | Johnson | A01K 83/06 43/44.2 |
| 2,780,022 | A | * | 2/1957 | Arntzen | A01K 85/16 43/44.6 |

(Continued)

FOREIGN PATENT DOCUMENTS

CA 2198942 A1 * 9/1998
FR 886776 A * 10/1943

(Continued)

OTHER PUBLICATIONS

"Fishlab BioFlyer Flying Fish Wings at ICAST 2021," TackDirect, YouTube (available at https://www.youtube.com/watch?v=9OxRQabomn0); assorted screenshots (Year: 2021).*

(Continued)

*Primary Examiner* — Darren W Ark
(74) *Attorney, Agent, or Firm* — Harpman & Harpman

(57) ABSTRACT

A method of attaching an artificial wing assembly to be used with a bait fish and/or lures to resemble flying fish bait. A pair of contoured natural looking synthetic wings are attached to a bait fish or lure by a skewer impaled through a portion of the bait or lure. A bait attachment saddle extends between the wings, each wing having a guide and access sleeve for positionally guiding and placement of the attachment skewer there through.

10 Claims, 4 Drawing Sheets

(56) References Cited

U.S. PATENT DOCUMENTS

| | | | | |
|---|---|---|---|---|
| 2,782,550 | A * | 2/1957 | Breti | A01K 83/06 43/44.4 |
| 2,795,886 | A * | 6/1957 | Johnson | A01K 83/06 43/44.2 |
| 3,105,319 | A * | 10/1963 | Whalen | A01K 83/06 43/44.4 |
| 3,415,004 | A * | 12/1968 | Whalen | A01K 83/06 43/44.4 |
| 3,645,031 | A * | 2/1972 | Egles | A01K 83/06 43/44.2 |
| 3,879,881 | A * | 4/1975 | Vick | A01K 85/16 43/42.23 |
| 3,992,801 | A * | 11/1976 | McDiarmid | A01K 83/06 43/44.8 |
| 4,067,135 | A * | 1/1978 | Martin | A01K 83/06 43/44.2 |
| 4,133,132 | A * | 1/1979 | Ellis | A01K 85/16 43/44.4 |
| 4,189,860 | A * | 2/1980 | Ebert | A01K 85/16 43/44.4 |
| 4,594,806 | A * | 6/1986 | Brown | A01K 85/14 43/42.27 |
| 4,848,023 | A * | 7/1989 | Ryder | A01K 83/06 43/44.4 |
| 4,858,370 | A * | 8/1989 | Ryder | A01K 85/00 43/42.26 |
| 4,869,014 | A * | 9/1989 | Francklyn | A01K 83/06 43/42.49 |
| 4,932,154 | A * | 6/1990 | Andreetti | A01K 83/06 43/44.6 |
| 5,172,510 | A * | 12/1992 | Lovell, Jr. | A01K 85/01 43/42.36 |
| 5,193,299 | A * | 3/1993 | Correll | A01K 85/00 43/42.47 |
| 5,209,008 | A * | 5/1993 | Kasznica | A01K 85/08 43/42.27 |
| 6,082,039 | A * | 7/2000 | McGuinness | A01K 85/00 43/4.5 |
| 6,230,433 | B1 * | 5/2001 | Nichols | A01K 85/00 43/44.2 |
| 6,516,552 | B2 * | 2/2003 | Hawkins | A01K 85/00 43/44.2 |
| 6,658,785 | B1 * | 12/2003 | Faulkner | A01K 83/06 43/44.2 |
| 6,708,442 | B2 | 3/2004 | Kress et al. | |
| 7,257,923 | B1 * | 8/2007 | Urbano, Jr. | A01K 83/06 43/44.2 |
| 8,024,887 | B2 * | 9/2011 | Milanowski | A01K 83/06 43/44.2 |
| 9,044,000 | B1 * | 6/2015 | Lumsden | A01K 83/06 |
| 9,192,150 | B1 * | 11/2015 | Palmer | A01K 85/00 |
| D881,333 | S * | 4/2020 | McKeral, Jr. | D22/133 |
| 2006/0075678 | A1 * | 4/2006 | Schammel | A01K 97/04 43/42.09 |
| 2008/0196293 | A1 * | 8/2008 | Milanowski | A01K 83/06 43/42.36 |
| 2008/0202016 | A1 * | 8/2008 | Robertson | A01K 85/08 43/42.35 |
| 2009/0100737 | A1 * | 4/2009 | Hunter | A01K 85/00 43/44.4 |
| 2014/0000149 | A1 * | 1/2014 | Signitzer | A01K 85/00 43/42.02 |
| 2014/0259869 | A1 * | 9/2014 | Scholfield | A01K 85/00 43/44.9 |
| 2014/0283434 | A1 * | 9/2014 | Teegarden | A01K 85/10 43/42.19 |
| 2015/0250153 | A1 * | 9/2015 | Storm | A01K 85/16 43/42.31 |
| 2018/0184633 | A1 * | 7/2018 | Parks | A01K 97/00 |
| 2019/0297864 | A1 * | 10/2019 | League | A01K 83/06 |
| 2021/0112793 | A1 * | 4/2021 | Joye | A01K 83/06 |
| 2022/0046906 | A1 * | 2/2022 | Moorhead | A01K 85/1817 |

FOREIGN PATENT DOCUMENTS

| | | | |
|---|---|---|---|
| FR | 55193 E | * | 10/1951 |
| GB | 190718391 A | * | 3/1908 |
| GB | 223156 A | * | 10/1924 |
| JP | 2014161329 A | * | 9/2014 |
| JP | 2014193131 A | * | 10/2014 |

OTHER PUBLICATIONS

"How to a Rig Flying Fish for BLUEFIN Tuna," Local Knowledge Fishing Show, YouTube (available at https://www.youtube.com/watch?v=WuLoY0UDHzY); assorted screenshots (Year: 2019).*

* cited by examiner

WING ATTACHMENT FOR BAIT FISH LURES

BACKGROUND OF THE INVENTION

1. Technical Field

This invention relates to fishing bait and lures used to attract fish by resembling different types of bait.

2. Description of Prior Art

Prior art devices have been developed for attaching lures to bait fish, see U.S. Pat. Nos. 9,192,150, 7,257,923, 6,708,442, 6,658,785 and 5,172,510.

In U.S. Pat. No. 9,192,150, a bait fish holder device is disclosed having a shape to impart rotation or oscillation motion to a bait fish to which it is attached having a pair of wing like extensions.

In U.S. Pat. No. 7,257,923 a fishing lure bait fish holder having a multi-surface enclosure bait portion is fitted over the head of a bait with wing extensions to improve movement of the bait during use.

U.S. Pat. No. 6,708,442 claims a placement hook for artificial lures and bait fish so a fishing line can be attached.

U.S. Pat. No. 6,658,785 is directed to a line fishing lure having a unitary weight body with a socket for receiving the head portion of a bait fish with an extending attached hook.

U.S. Pat. No. 5,172,510 shows a semi-artificial fish lure to simulate a lure fish having an integrated artificial tail with a lead line extending therefrom.

SUMMARY OF THE INVENTION

A method of simulating a flying fish by attaching wings to a bait or artificial lures that creates a distinctive winged configuration of a flying fish on a common bait fish or artificial lure. The wing attachment has a pair of extending simulated flying fish wings and bait engagement saddle, each with a sleeve for inserting a rigid or flexible skewer through the bait fish lure. The wing attachment is of a positive buoyancy semi-rigid nature to maintain its extended attached wing shape during use. An apertured line attachment tab extends from the bait engagement saddle for pulling the bait fish lure through the water.

DETAILED DESCRIPTION OF THE INVENTION

Figure 1:
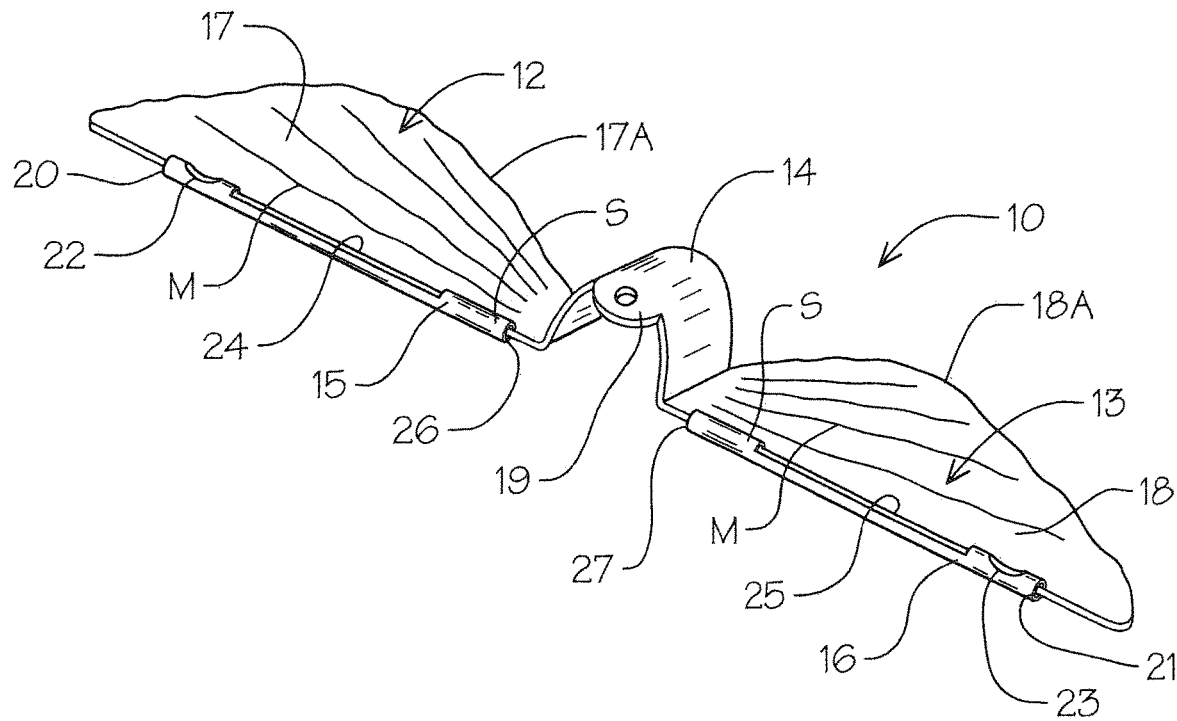
FIG. 1 is a top, front perspective view of the wing attachment for a bait fish lure.

Referring now to FIGS. 1-4 of the drawings, a flying fish wing attachment method is illustrated having a wing attachment 10 with a pair of interconnected oppositely disposed wing elements 12 and 13 extending integrally from a center inverted U-shaped bait engagement saddle 14. Each of the wing elements 12 and 13 have an elongated tubular sleeve leading edge portions 15 and 16 with a generally flat extending wing members 17 and 18 with a contoured trailing edge 17A and 18A, best seen in FIGS. 1, 3 and 4 of the drawings. The interconnecting bait engagement saddle 14 defines a contoured arch band configuration with an integral apertured tab 19 extending centrally therefrom. The apertured tab 19 provides a point of attachment for a fishing hook or lead line assembly, not shown, to pull the wing bait through the water during use.

Each of the wing members 17 and 18 are preferably formed of synthetic resin material and have surface defined markings M to help emulate the distinctive pattern of flying fish wings, not shown. The wing elements 12 and 13 and the engagement saddle 14 have a positive buoyancy during use and the wing members 17 and 18 are of a material structural rigidity to help maintain their shape when applied to a bait fish lure BFL represented in broken lines in FIGS. 2-4 of the drawings as will be discussed in detail hereinafter.

The elongated tubular sleeve leading edge portions 15 and 16 of the wings 12 and 13 each have respective closed ends at 20 and 21 with individual surface insertion access openings 22 and 23 therein adjacent thereto.

Elongated viewing window openings 24 and 25 are formed in the respective tubular sleeves 15 and 16 midway there along in spaced relation to the insertion access openings 22 and 23 and respective open sleeve ends 26 and 27 adjacent the interconnecting engagement saddle 14.

Figure 3:
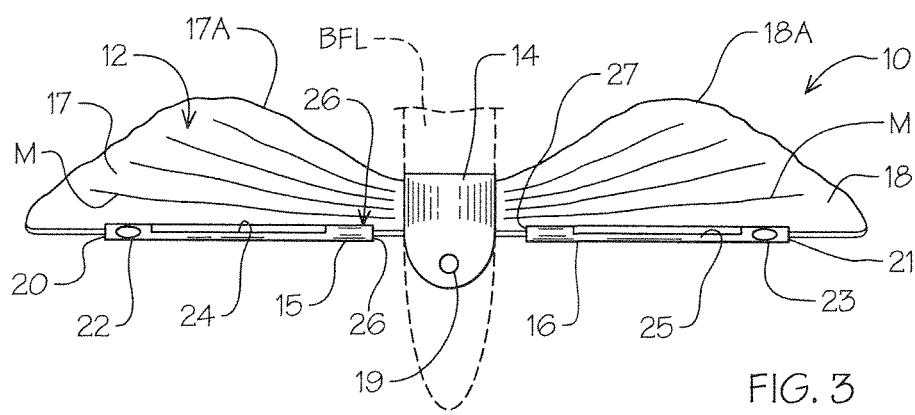
FIG. 3 is a top plan view of the wing attachment with a bait fish lure representation illustrated partially in broken lines.
Figure 4:
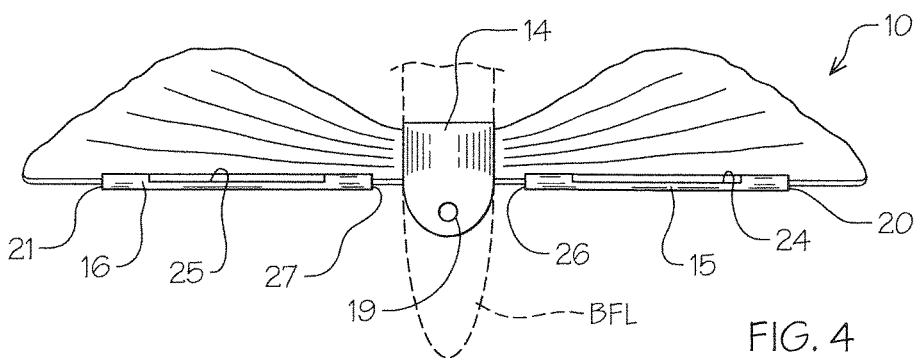
FIG. 4 is a bottom plan view thereof.
Figure 5:
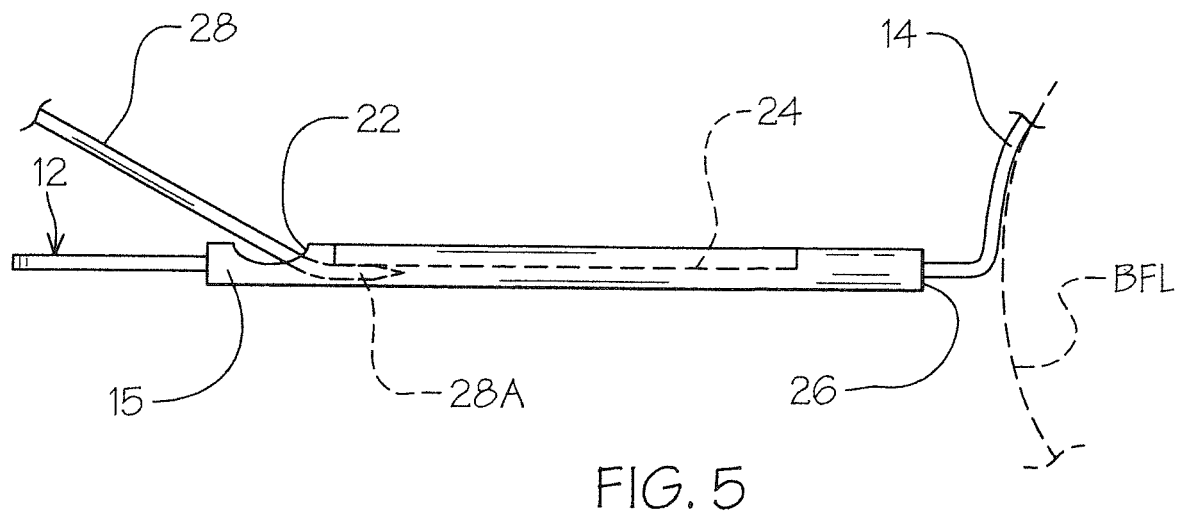
FIG. 5 is an enlarged partial front elevational view of a guide sleeve on a wing with an attachment skewer illustrated positioned entering the skewer.

It will be apparent that the orientation of the access openings 22 and 23 are therefore in the upper surface S of the respective sleeves 15 and 16 and the orientation of the viewing window openings 24 and 25 correspondingly extend along their respective edge surfaces effacing their respective wings trailing edges 17A and 18A, best seen in FIGS. 1, 3 and 4 of the drawings.

Figure 2:
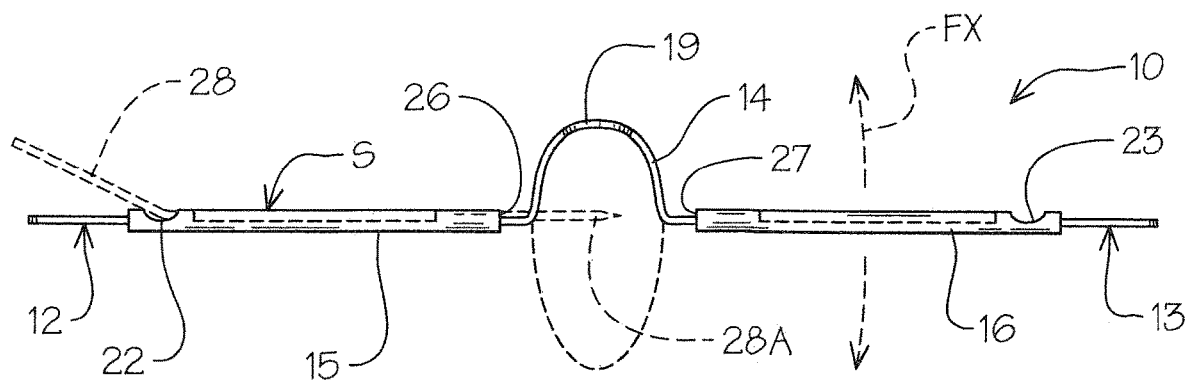
FIG. 2 is a front elevational view of the wing attachment with a bait fish lure representation shown in broken lines.

It will be evident from the above description that while the wing attachment 10 is rigid enough to hold its shape during use, as discussed, it will have the ability due to its structural material makeup to bend under exterior pressure for deflection of the respective wings 12 and 13 in relation to the engagement saddle 14 which may be required in some applications for attachment and removal with directional orientation illustrated by flex arrows FX in FIG. 2 of the drawings.

Referring now to FIGS. 2, 5, 6 and 7 of the drawings, a wing attachment method is illustrated having an attachment skewer 28 shown in broken and solid lines for insertion through and retainment in the respective leading edge sleeve portions 15 and 16 of the wings. In use, a skewer 28 is needed for insertion through one of the respective access openings 22 or 23 depending on initial wing attachment side chosen by user, not shown.

The preferred wing attachment orientation will be from the top of the bait fish lure BFL with the skewer 28 conforming initially upon insertion at 28A, as noted, and then passing through the respective sleeve edge portions 15 and 16 with positional orientation being confirmed through corresponding viewing windows 24 and 25 within the respective sleeve portions. The end of the skewer 28 is pointed at 28A so as to penetrate the bait fish lure BFL as it extends from the respective open end 26 of the sleeve 15 as the wing attachment 10 is positioned thereon, best seen in FIGS. 2 and 6 of the drawings for attachment of the wing 10 to the fishing bait lure FBL.

The windows 24 and 25 will also act as access recovery portals for retrieving the skewer 28, if needed, which is preferably in this application made of material such as bamboo.

Figure 6:
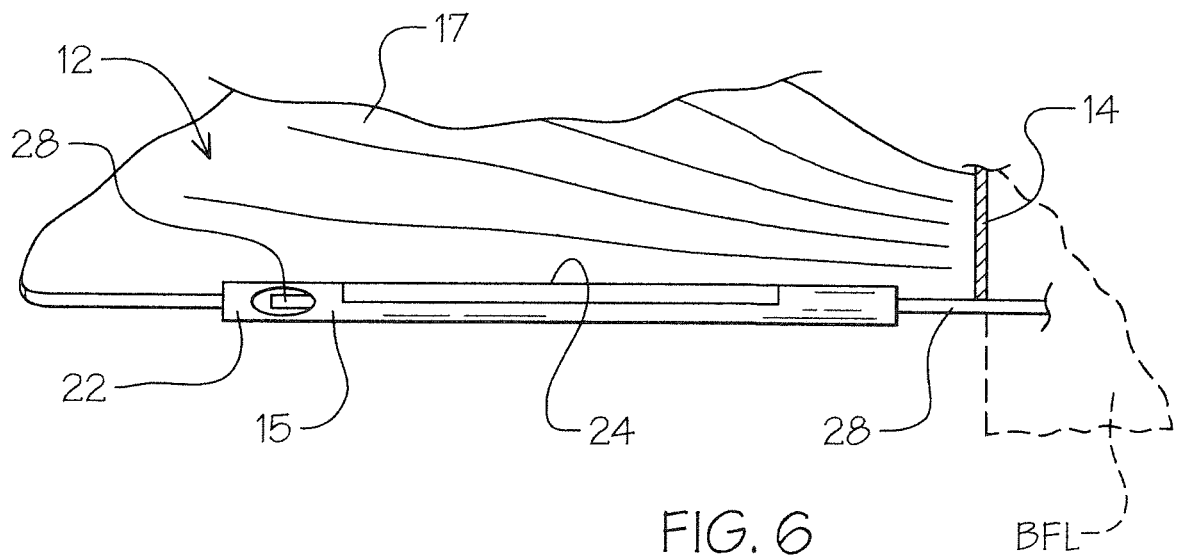
FIG. 6 is an enlarged partial top plan view of a guide sleeve on the wing with the skewer inserted within and a bait fish lure illustrated in broken lines.
Figure 7:
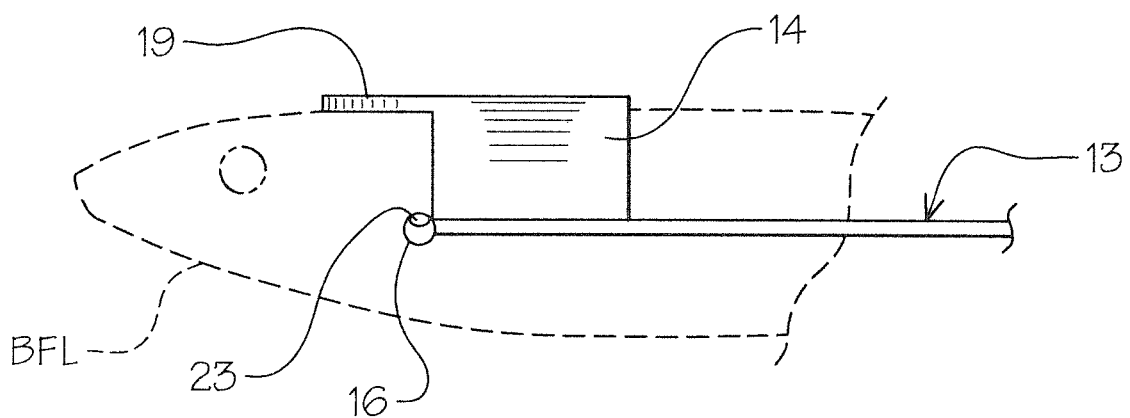
FIG. 7 is an enlarged side elevational view of the wing attachment with a partial view of a bait fish shown in broken lines engaged thereon.

Once the skewer 28 is so inserted, it will be retained, as noted, within the respective sleeve portions 15 and 16 as indicated in FIG. 6 of the drawings securing the wing attachment 10 to the bait fish lure BFL.

It will thus be seen that the above disclosed fly-fishing wing attachment wings 10 will provide an improved fishing bait by converting common bait fish and artificial lures into a flying fish bait representation in a simple one step process while maintaining the integrity of the bait fish used and the artificial lure.

It will be noted that based on the selected material chosen for the wing elements 12 and 13 and bait engagement saddle 14, that flexibility may be imparted so, if needed, in certain applications, as noted, hereinbefore.

It will be evident from the above description that various changes and modifications may be made therein without departing from the spirit of the invention.

Therefore I claim:

1. A method of attaching an artificial wing assembly to a bait fish lure comprises:
    forming said artificial wing wing assembly having a contoured bait engagement saddle and a pair of oppositely disposed wing elements extending therefrom,
    each of said wing elements having a leading edge and a trailing edge,
    forming a skewer retaining sleeve at the leading edge of each of said wing elements,
    said skewer retaining sleeve having an open sleeve end and a closed sleeve end,
    forming a skewer access opening and an elongated viewing window in each of said skewer retaining sleeves,
    positionally engaging the contoured bait engagement saddle on the bait fish lure,
    inserting a skewer through at least one of said skewer access openings of said skewer retaining sleeves and through the bait fish lure positioned between said skewer retaining sleeves, securing said wing assembly to said bait fish lure, and
    retaining the inserted skewer in the skewer retaining sleeves.

2. The method of attaching an artificial wing assembly set forth in claim 1 wherein said bait engagement saddle comprises:
    a U-shaped band extending integrally between said wing elements.

3. The method of attaching an artificial wing assembly set forth in claim 2 wherein said bait engagement saddle further comprises: an integral contoured aperture tab extending therefrom.

4. The method of attaching an artificial wing assembly set forth in claim 2 wherein said bait engagement saddle is flexible.

5. The method of attaching an artificial wing assembly set forth in claim 1 wherein said wing elements of said artificial wing assembly further comprise:
    flat wing members extending from said leading edges of said wing elements.

6. The method of attaching an artificial wing assembly set forth in claim 1 wherein the step of forming a skewer access opening and an elongated viewing window in each of said skewer retaining sleeves comprises:
    forming said skewer access opening in an upper surface of each of said skewer retaining sleeves adjacent said closed sleeve end of each of said skewer retaining sleeves, and
    forming said elongated viewing window in each of said skewer retaining sleeves comprises:
        defining an elongated opening in each of said skewer retaining sleeves midway between said skewer access opening and said open sleeve end of each of said skewer retaining sleeves.

7. The method of attaching an artificial wing assembly set forth in claim 1 wherein the step of inserting said skewer through at least one of said skewer access openings of said skewer retaining sleeves comprises:
    aligning a pointed end of said skewer through said at least one of said skewer access openings in the respective skewer retaining sleeve.

8. The method of attaching an artificial wing assembly set forth in claim 1 wherein said elongated viewing windows in said skewer retaining sleeves are facing the trailing edges of the wing elements.

9. The method of attaching an artificial wing assembly set forth in claim 1 wherein the trailing edge of each of said wing elements is contoured extending from an end of said leading edge to the bait engagement saddle.

10. The method of attaching an artificial wing assembly set forth in claim 1 wherein said wing assembly is formed from a material having positive buoyancy.

\* \* \* \* \*